United States Patent
Jeffers

(10) Patent No.: US 12,060,886 B2
(45) Date of Patent: Aug. 13, 2024

(54) POWER SOURCE FOR INFLATION SYSTEM (SOLID-STATE BATTERY)

(71) Applicant: Air Cruisers Company, LLC, Wall Township, NJ (US)

(72) Inventor: Mark Jeffers, Wall Township, NJ (US)

(73) Assignee: AIR CRUISERS COMPANY, LLC, Wall Township, NJ (US)

( * ) Notice: Subject to any disclaimer, the term of this patent is extended or adjusted under 35 U.S.C. 154(b) by 359 days.

(21) Appl. No.: 17/379,874

(22) Filed: Jul. 19, 2021

(65) Prior Publication Data

US 2023/0131378 A1    Apr. 27, 2023

(51) Int. Cl.

| | |
|---|---|
| *F04D 25/06* | (2006.01) |
| *B63C 9/04* | (2006.01) |
| *B63C 9/125* | (2006.01) |
| *B64D 25/14* | (2006.01) |
| *B64D 25/18* | (2006.01) |
| *E04H 15/20* | (2006.01) |
| *F04D 17/10* | (2006.01) |

(Continued)

(52) U.S. Cl.
CPC ............ *F04D 25/0673* (2013.01); *B63C 9/04* (2013.01); *B63C 9/1255* (2013.01); *B64D 25/14* (2013.01); *B64D 25/18* (2013.01); *E04H 15/20* (2013.01); *F04D 17/10* (2013.01); *F04D 29/002* (2013.01); *H01M 10/425* (2013.01); *B63C 2009/0047* (2013.01); *B63C 2009/042* (2013.01); *E04H 2015/206* (2013.01); *H01M 2220/20* (2013.01)

(58) Field of Classification Search
CPC ................................ B63C 9/04; B63C 9/1255
See application file for complete search history.

(56) References Cited

U.S. PATENT DOCUMENTS 3,048,643 A * 8/1962 Gunnar ................... H10N 10/17
                                                          136/200
3,523,065 A * 8/1970 Schmidt ................... C10B 31/00
                                                          414/163

(Continued)

FOREIGN PATENT DOCUMENTS

| EP | 3822170 A1 | 5/2021 |
|---|---|---|
| RU | 177432 U1 | 2/2018 |

(Continued)

OTHER PUBLICATIONS

France Application No. 2300373, Search Report mailed on Aug. 23, 2023, 19 pages (11 pages of Original Document and 8 pages of English Translation).

(Continued)

*Primary Examiner* — S. Joseph Morano
*Assistant Examiner* — Jovon E Hayes
(74) *Attorney, Agent, or Firm* — Kilpatrick Townsend & Stockton LLP

(57) ABSTRACT

A power source for inflation systems. Specific embodiments relate to inflation systems that use an electrically-powered inflation system, wherein the power source of the inflation system is a solid state battery. Particular embodiments may find use in connection with inflating evacuation slides or life rafts on board a passenger transportation vehicle, such as an aircraft or marine vessel. Other embodiments may be used for inflating shelters, life vests, or any other inflatable safety device that requires a rapid inflation.

14 Claims, 5 Drawing Sheets

(51) Int. Cl.
  *F04D 29/00* (2006.01)
  *H01M 10/42* (2006.01)
  *B63C 9/00* (2006.01)

(56) References Cited

U.S. PATENT DOCUMENTS

| | | | | |
|---|---|---|---|---|
| 5,100,170 | A * | 3/1992 | Mihm | F42B 39/14 |
| | | | | 280/736 |
| 5,167,426 | A * | 12/1992 | Mihm | F42B 39/14 |
| | | | | 280/736 |
| 5,251,851 | A * | 10/1993 | Herrmann | B64C 1/143 |
| | | | | 49/141 |
| 9,637,210 | B2 | 5/2017 | Thomson | |
| 2008/0110365 | A1 | 5/2008 | Rastegar et al. | |
| 2012/0060267 | A1 * | 3/2012 | Blenkarn | A63B 29/00 |
| | | | | 2/456 |
| 2012/0088134 | A1 | 4/2012 | Wood et al. | |
| 2016/0107733 | A1 * | 4/2016 | Thomson | F04D 29/4206 |
| | | | | 417/53 |
| 2021/0009276 | A1 * | 1/2021 | Haynes | B64D 25/14 |
| 2021/0139153 | A1 * | 5/2021 | Haynes | B64D 25/16 |
| 2022/0009642 | A1 * | 1/2022 | Shen | B01J 7/00 |
| 2022/0082105 | A1 * | 3/2022 | Kuppan | F04D 27/0269 |

FOREIGN PATENT DOCUMENTS

| | | | | |
|---|---|---|---|---|
| WO | 2022117453 | A1 | 6/2022 | |
| WO | WO-2022117453 | A1 * | 6/2022 | B64C 1/1423 |

OTHER PUBLICATIONS

France Application No. 2300374, Search Report mailed on Aug. 24, 2023, 20 pages (11 pages of Original Document and 9 pages of English Translation).

Zhang et al., An Advanced Ni-graphite Molten Salt Battery With 95 Operating Temperature for Energy Storage Application, Chemical Engineering Journal, vol. 435, Feb. 7, 2022, 11 pages.

French Application No. 2300373, First Office Action, mailed on Apr. 17, 2023, 3 pages (1 page English summary, 2 pages original document).

French Application No. 2300373, Second Office Action, mailed on Apr. 17, 2023, 3 pages (1 page English summary, 2 pages original document).

French Application No. 2300374, First Office Action, mailed on Apr. 17, 2023, 3 pages (1 page English summary, 2 pages original document).

French Application No. 2300374, Second Office Action, mailed on Apr. 17, 2023, 3 pages (1 page English summary, 2 pages original document).

Baldwin, Samsung Reveals Breakthrough: Solid-State EV Battery with 500-Mile Range, Car And Driver, Available Online at: https://www.caranddriver.com/news/a31409442/samsung-solid-state-battery-revealed/, Mar. 12, 2020, 8 pages.

Baldwin, Toyota's Quick-Charging Solid-State Battery Coming in 2025, Car And Driver, Available Online at: https://www.caranddriver.com/news/a33435923/toyota-solid-state-battery-2025/, Jul. 27, 2020, 9 pages.

U.S. Appl. No. 17/379,536, Non-Final Office Action mailed on Apr. 4, 2024, 12 pages.

* cited by examiner

POWER SOURCE FOR INFLATION SYSTEM (SOLID-STATE BATTERY)

FIELD OF THE DISCLOSURE

Embodiments of the present disclosure relate generally to a power source for inflation systems. Specific embodiments relate to inflation systems that use an electrically powered inflation system, wherein the power source of the inflation system is a solid state battery. Particular embodiments may find use in connection with inflating evacuation slides or life rafts on board a passenger transportation vehicle, such as an aircraft or marine vessel. Other embodiments may be used for inflating shelters, life vests, or any other inflatable safety device that requires a rapid inflation.

BACKGROUND

An evacuation slide is an inflatable slide used to allow passengers and crew to evacuate an aircraft in the event of an emergency. An evacuation slide is required on all passenger-carrying aircraft where the door sill height cannot allow evacuation of persons from the door uninjured. Currently, the Federal Aviation Administration (FAA) requires slides on all aircraft doors where the floor is 6 feet (1.8 m) or more above the ground. Such slides are generally provided with one or more inflatable chambers.

Evacuation slides are typically packed and held within the door structure inside the slide/door bustle, which is a protruding part inside an aircraft door. Alternatively, the slide may be packed within a fuselage enclosure located under or near the door or wing. A slide bustle typically houses the evacuation slide, as well as the inflation system that will be used to inflate the slide. Many but not all slides are also designed to double as life rafts in case of a water landing and evacuation.

It is desirable for evacuation slides and/or life rafts to inflate quickly and reliably. The FAA currently requires evacuation of the entire aircraft in 90 seconds using 50% of the available evacuation exits in dark-of-night. To meet this requirement, evacuation slides should deploy in less than 10 seconds, and in many instances, should deploy in less than 6 seconds. In some examples, the evacuation slides should deploy in about 3 seconds. A successful evacuation slide deployment should be complete in about 5-7 seconds (depending upon weather conditions, such as temperature and winds) at all relevant atmospheric pressure conditions. These factors can affect performance of various slide deployment features described herein. Life rafts are typically required to be fully deployed and boardable by the first occupant within one minute after the start of inflation. (Although exemplary deployment conditions are described herein, it should be understood that government regulations may change, and accordingly, inflatable safety device deployment goal times and battery load requirements may be altered accordingly.) A deployed evacuation slide 16 from an aircraft door is illustrated by FIG. 1. A high pressure of gas is thus required to make evacuation slide and/or life raft deployment happen in the desired time period.

Inflation systems for these types of evacuation slides and/or life rafts generally use compressed gas for inflation. For example, the evacuation slide and/or life raft may be coupled with a container of compressed gas used to inflate the structure. One or multiple chambers of the safety system may be inflated upon (or before) deployment of the safety system.

In use, if the aircraft doors are opened while the slide bustle is in an armed state, opening of the door pulls the slide pack out of the slide bustle. Once freed, the slide will fall (under gravity), pulling a pin from a valve of a container containing compressed gas and causing the slide to inflate. Currently, evacuation slides and life rafts use non-explosive, inert gas inflation systems. Similar systems are also used for life rafts.

The inflation system usually includes a pressurized cylinder, a regulating valve, high pressure hoses, and aspirators. The cylinder can be from about 100 to about 1600 cubic inches and filled to about 3000 to 3300 psig with either gaseous nitrogen, or a mixture of gaseous $CO_2$ and nitrogen. In order to accommodate weight considerations, most cylinders are now made of aluminum or alloy cores wrapped with fiberglass, carbon fiber or other lightweight materials rather than steel, but weight reductions are still desirable. The regulating valve is used to mechanically meter out the gas at a desired rate.

However, inflation of the evacuation slides and life rafts using compressed gas can present various challenges. For example, compressed gas can be dangerous, difficult to transport, and prone to leaks. Compressed gas containers also carry an associated size and weight, which can be undesirable on board an aircraft where size and weight are at a premium. Accordingly, improved inflation systems are desirable.

The current assignee has thus developed an electric powered inflation system, which is shown and described in U.S. Pat. No. 9,637,210, the entire disclosure of which is hereby incorporated by reference. That patent provides an electrically powered inflation system for inflating an inflatable structure on-board a passenger transportation vehicle. The inflation system includes a compressor wheel mounted with respect to a motor mount and a compressor housing. An electric motor is provided to impart rotational speed to the compressor wheel. In some embodiments, the compressor wheel has a cone-shaped backplate that supports curved blades. In use, ambient air enters an intake inlet along the inlet axis and exits the compressor wheel at a diagonal angle with respect to the inlet axis. One example of an electrically-powered inflation system 10 is shown by FIG. 2.

Previous battery technologies used for household and/or leisure-use inflatables (and other types of non-safety inflatables) have not been acceptable for inflating passenger life rafts or evacuation slides, which must inflate within certain time limits for their use as safety devices. Additionally, battery size and weight are primary considerations for use on board aircraft. In the past, in order to have enough power to run an inflation system for long enough to inflate an entire unit, batteries have had to be quite large and heavy. With newer battery technologies, the amount of energy stored in the same weight and space can be increased. Additionally, newer batteries can have a higher rate of discharge.

The '210 patent describes various battery options, including a lithium metal oxide battery or a lithium ion battery (one specific example of which is an 18650 lithium cell battery, such as the Molicel lithium ion rechargeable battery). Other power sources described are a fuel cell or a generator, such as a gas generator. However, the present inventors have continued to explore improved battery source options for their electrically powered inflation system. Exemplary improved power sources are described herein.

SUMMARY

Accordingly, the present inventors have developed alternative power sources for use with electrically-powered inflation systems that inflate evacuation slides and/or life rafts, as well as other inflatable safety equipment.

In one example, there is provided an inflation system for an inflatable safety device, comprising: an electrically-powered motor; a solid state battery that provides a power source for the electrically-powered motor, wherein a controller is activated upon a controller activation event, wherein once the controller is activated, power from the solid state battery is delivered to the electrically-powered motor upon an inflation initiation event.

In any of the above or subsequent examples, the controller activation event may be one or more of:
- motion or opening of a vehicle door or handle;
- manual activation via a mechanical connection between the door/handle and the switch and/or controller;
- activation or tensioning of a release feature, cable, cord, pin, or webbing
- via electrical activation;
- via a signal from the cockpit;
- via a signal or action from one of the pilots, flight attendants, passengers, or other crewmembers;
- via a standby electrical device;
- or any combination thereof.

In any of the above or subsequent examples, there may also be provided a sensor that can detect movement of an aircraft door or handle in order to function as a controller activation event.

In any of the above or subsequent examples, the inflation initiation event may be one or more of:
- a time-based activation, such that a certain amount of time after the controller activation event, a timer activates a controller to activate the motor;
- activation of battery itself activates the controller;
- removal of the inflatable safety device from its storage compartment;
- dropping of the inflatable safety device via gravity;
- the ejection of the pack via an ejection system;
- via a rip cord, cord, cable, webbing, switch, or pull pin that is caused to be activated (either via gravity or by aircraft personnel or occupants;
- via a second sensor or switch connected to the door that activates a controller once the door has been opened a certain amount;
- via remote control;
- via water contact or a water activated trigger activated by a water contact/presence sensor;
- via orientation or movement of the system;
- or any combination thereof.

In any of the above or subsequent examples, there may be provided a pressure sensor or switch that can monitor inflation pressure, wherein if inflation pressure drops below a predetermined threshold, a signal is sent to switch the electrically-powered motor back on.

In any of the above or subsequent examples, the solid state battery is in direct contact with the electric powered motor or is positioned a distance from the electric powered motor.

In any of the above or subsequent examples, the solid state battery is located on the inflatable safety device, on a packboard assembly, in an enclosure of the inflatable safety device, or on a vehicle door.

In any of the above or subsequent examples, the inflatable safety device comprises an evacuation slide and wherein the solid state battery delivers about can deliver about 5-20 kW of power.

In any of the above or subsequent examples, the inflatable safety device comprises a life raft and wherein the solid state battery delivers about 100-2000 watts of power.

In any of the above or subsequent examples, the inflatable safety device comprises a life jacket and wherein the solid state battery delivers about 5-50 watts of power.

In any of the above or subsequent examples, the inflatable safety device comprises an inflatable shelter and wherein the solid state battery delivers about 50-1000 watts of power.

In any of the above or subsequent examples, the solid state battery comprises a load profile that provides a high burst of power within at least about 3-60 seconds and provides a sustained option for powering the electric powered motor during inflation and relevant usage time of the inflatable safety device.

In any of the above or subsequent examples, the solid state battery has a volume of about 6-100 cubic inches.

The terms "invention," "the invention," "this invention" "the present invention," "disclosure," "the disclosure," and "the present disclosure," used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

DETAILED DESCRIPTION

One of the problems experienced with electrically powered inflation systems is identifying a viable power source. As background, aircraft evacuation slides are required to be deployed extremely quickly. In most instances, an entire slide must be inflated in as short as six seconds. The aircraft evacuation slide should also stay deployed during its entire use period, which, under current regulations is about 90 seconds. (Government regulations require that an aircraft have a sufficient number of evacuation slides and evacuation doors that allow the entire aircraft to be evacuated within 90 seconds of an emergency event.) Accordingly, the power source for the inflation system must be capable of delivering a very high power output for the first 1-6 seconds of operation in order to fully and quickly inflate the slide. It should also be able to maintain inflation for the duration of use, which, in most instances will be at least 90 seconds. (Although this disclosure is described in connection with aircraft evacuation slides, it should be understood that the power systems described herein are usable in connection with any other type of inflatable safety device, such as evacuation slides, evacuation slide/rafts, life rafts, emergency floats, emergency flotation systems, life preservers, inflatable decontamination shelters, inflatable shelters, inflatable military shelters, aviation life rafts, marine life rafts, ship decoys and inflatable military targets, space applications of the aforementioned, or any combination thereof.)

In order to achieve a weight and size target when using an electrically-powered inflation system, a small, lightweight but powerful energy source is needed. There are many options to power an electrically-powered inflation system, but most entail significant drawbacks, including performance, weight, charging, storage, and safety problems.

For example, one downside of using a lithium ion battery is that it requires liquid or gel electrolytes, which can be unstable at certain temperature ranges. Liquid electrolyte lithium-ion batteries may also exhibit decreased performance at low temperatures. The internal resistance of the battery increases with cycling and age, which reduces maximum current draw. Eventually, this increasing internal resistance can leave a lithium ion battery in a state such that it can no longer support the normal discharge currents required for powering the inflation motor without unacceptable voltage drop or overheating. Furthermore, lithium-ion batteries contain a flammable electrolyte that may explode or combust if overheated, damaged, or otherwise exposed to high or low temperatures or pressures.

Figure 5:
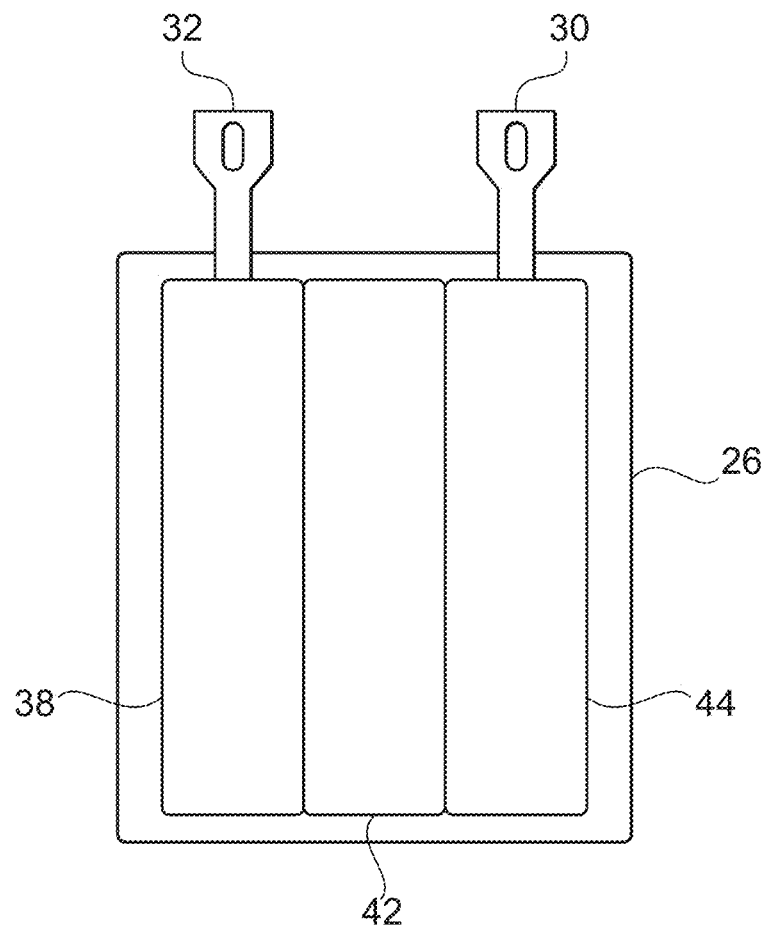
FIG. 5 is a cross sectional view of one embodiment of a solid state battery.

Accordingly, embodiments of the present disclosure provide a solid state battery used to power an electrically-powered inflation system. An exemplary solid state battery is illustrated by FIG. 5.

The solid state battery of this disclosure can be designed to provide high power for a longer duration and for multiple occurrences, if need be. The load profile should provide a very high power output for a short period of time (e.g., about 1 to 6 seconds) until the evacuation slide is inflated. Then, the load profile should continue to deploy (or otherwise be available to top off a potential leak) for the evacuation slide use duration (e.g., at least about 60-120 seconds). The load profile can be altered based on necessary flow rates in order to reach the desired inflation parameters, as well as necessary inflation pressures in order to maintain the desired inflation parameters.

If the solid state battery is used in connection with an inflation system for a life raft or life vest, it is desirable for the solid state battery to activate the motor until the battery is fully depleted (e.g., so that the motor remains active and available for inflating or otherwise topping off the life raft or life vest until the solid state battery power source is no longer functional.)

Exemplary flow rates of the electrically-powered inflation system may include from about 10 to about 2400 cubic feet per minute (CFM). For example, the electrically powered inflation system may inflate a life raft at about 15 CFM to about 320 CFM. The electrically powered inflation system may inflate inflatable shelters at about 15 CFM to about 320 CFM. The electrically powered inflation system may inflate an evacuation slide at about 340 CFM to about 2250 CFM. (The flow rate for evacuation slides is generally desirably higher than that of rafts or shelters because evacuation slides must inflate in a shorter amount of time than that required for rafts and shelters.) These ranges are provided for exemplary purposes only, in order to illustrate some initial flow rates that have been achievable.

Exemplary inflation pressures include from about 1 to about 120 pounds per square inch gage (psig). For example, the electrically powered inflation system described by the '210 patent may inflate a life raft at about 1.0-3.5 psig or from about 1.0-4.0 psig; may inflate an evacuation slide at about 1.0-3.5 psig or from about 1.0-4.0 psig; and/or may inflate an inflatable shelter at about 30-120 psig. (The pressure for inflatable shelters is generally higher because the tubes that make the shelters are generally of small diameter.)

In order to design the solid state battery to function this way, it is possible to modify the battery in order to reach the desired load profiles. It should be understood that differently-sized inflatable devices for use with differently-sized aircraft may require different load profiles. One of ordinary skill in the art would understand how to modify the disclosed solid state battery in order to reach the desired load profiles. When designing load profiles, the amount of time that the battery needs to provide power as well as the desired amount of voltage can be considered.

Specific dimensions and features of an exemplary solid state battery are now provided. It should be understood, however, that these details are provided for illustrative purposes only, and that different sizes, weights, dimensions, and materials are possible for use. In one specific example, the solid state battery configuration has a length of about 3-8 inches, and in one specific embodiment, from about 4-5 inches. The solid state battery configuration may have a diameter of about 2-7 inches, and in one specific embodiment, from about 3 to 4 inches. The solid state battery configuration may have a weight of about 1-8 pounds, and in one specific embodiment, from about 4 to 5 pounds. The volume of the solid state battery may be about 6-100 in$^3$.

The solid state battery configuration may have an anode 38, a cathode 44, and an electrolyte 42. The solid state battery case 26 may be a stainless steel case. It should be understood that a titanium case may be used if weight is critical, although adding expense to the manufacturer. One or more mounting features may be provided on the case in order to facilitate installation.

Figure 1:
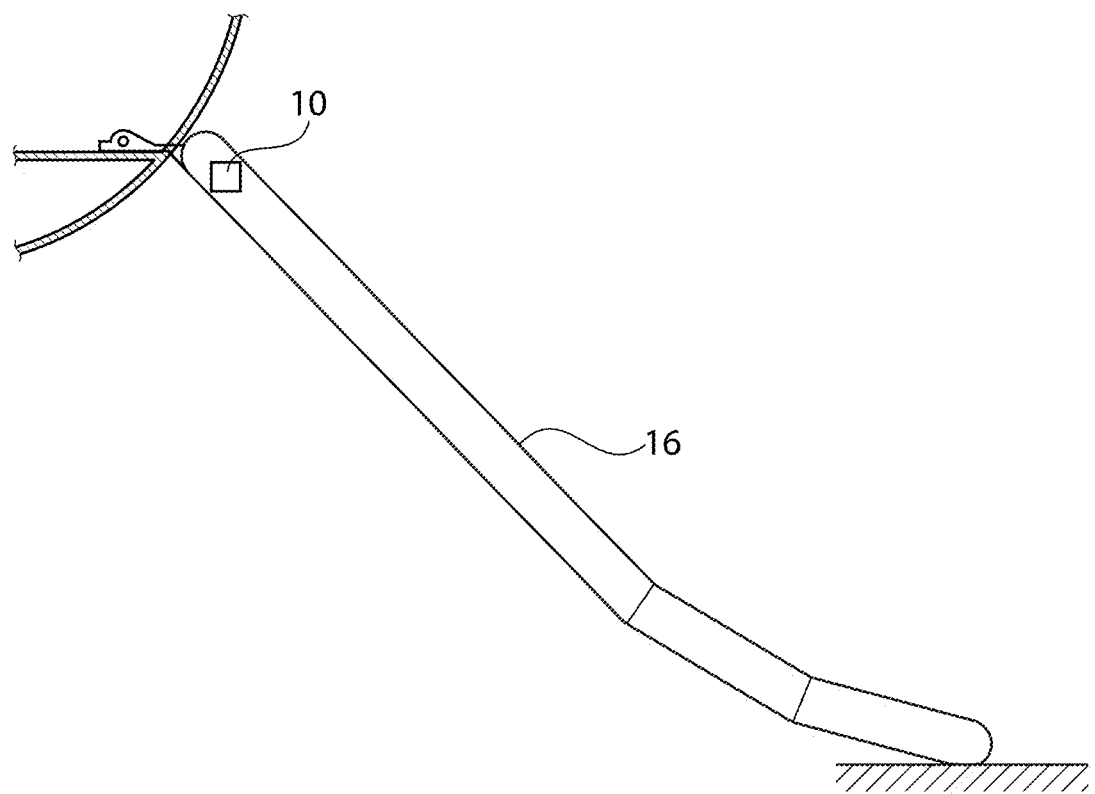
FIG. 1 is a side schematic view illustrating a deployed evacuation slide from an aircraft.
Figure 2:
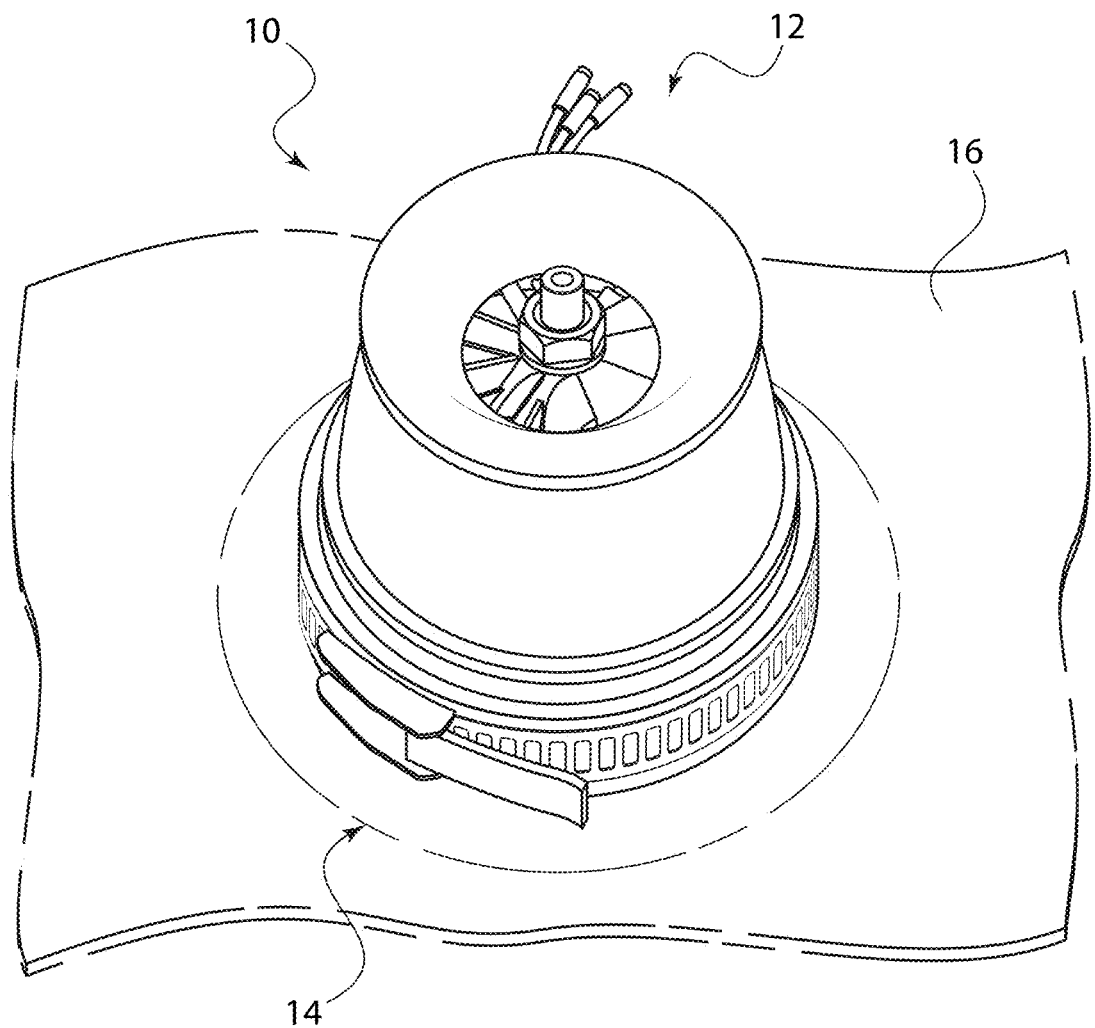
FIG. 2 is a side perspective view of one embodiment of an electrically powered inflation system.
Figure 3:
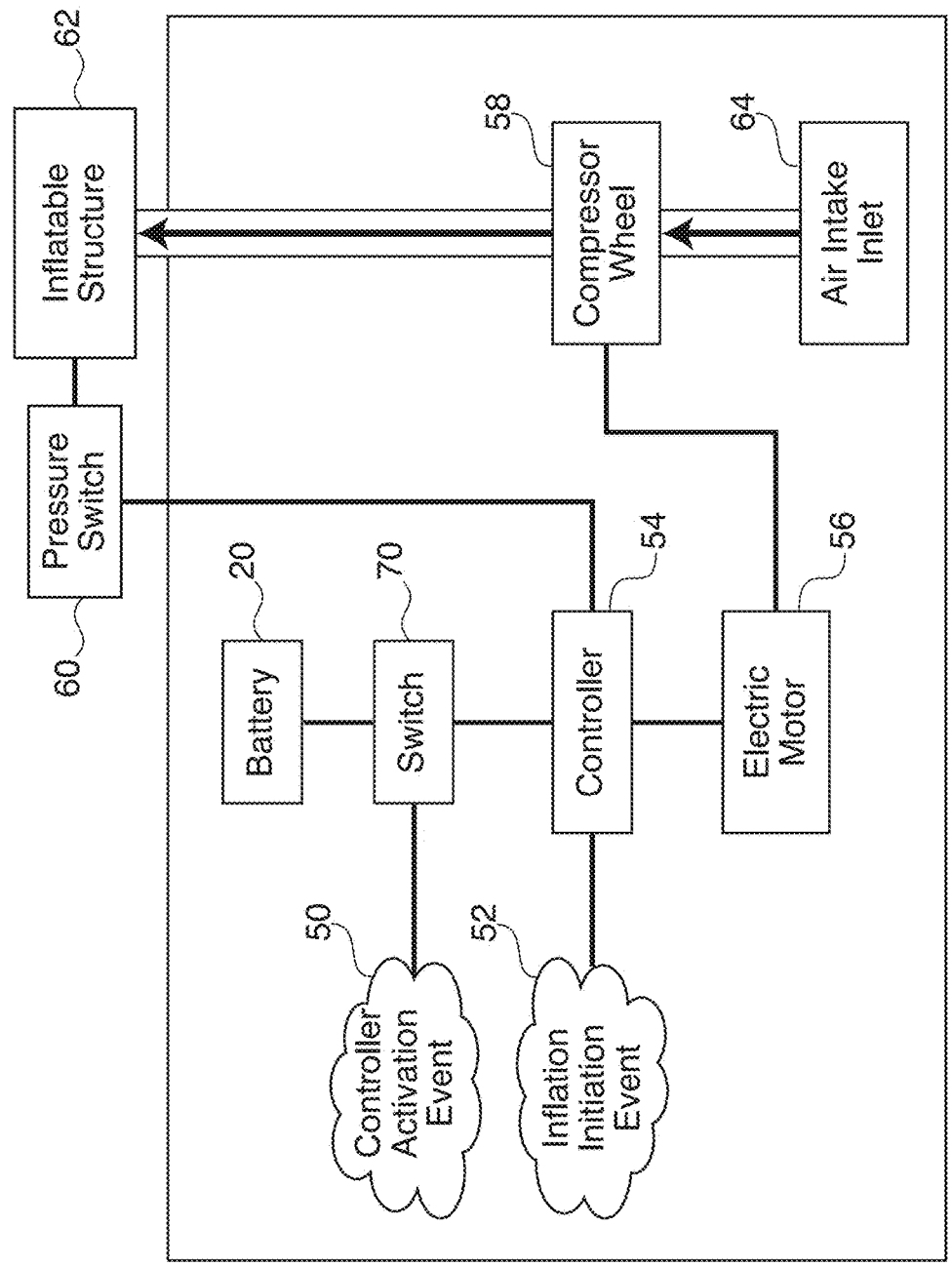
FIG. 3 is a schematic flow chart illustrating operation of an inflation system in order to inflate an inflatable structure.

The system may be provided with inflation device-specific features. These inflation device-specific features can be provided so that the battery is triggered to activate the motor only upon a particular occurrence or event. As illustrated by the schematic of FIG. 3, an inflation sequence has two primary "activation events." One event is the "controller activation event" 50. In one example, this event activates a switch to activate the solid state battery into an active voltage source. If a switch is not used, it is possible to periodically recharge the solid state battery to prevent it from draining.

Another event is the "inflation initiation event" 52, which event activates inflation of the inflatable safety device (tells controller to send power from the battery to the motor). The "inflation initiation event" 52 is outlined in more detail by FIG. 4. The controller activation event 50 occurs first, and once the battery is an active voltage source, whenever the inflation initiation event 52 occurs, power from the solid state battery 20 is sent to the motor, which begins inflation of the inflatable safety device.

The controller activation event 50 may be a specific event that occurs at the beginning of an emergency situation. In one example, the solid state battery 20 may be associated with a switch 70. When activated, the switch 70 sends a signal to the battery 20 to begin delivering power. In one example, the switch 70 may also be associated with and activated by a sensor. The sensor can detect motion of the door that supports the inflatable safety device. Motion or opening of the door itself, or motion of the door handle, can activate the switch to turn on solid state battery. In a specific example, this motion can cause an electrical activation of the solid state battery. In another example, this motion can cause a mechanical activation of the switch 70. Mechanical activation may occur via a cable, pin, pull cord, (or any other appropriate mechanical connection between the door and battery) that tensions or releases, which activates the switch 70. In a specific example, opening of the door or movement of the door handle mechanically pulls or otherwise engages/releases a release feature such as a cable/pin, cord, webbing (or any other option) which can cause activation of the switch 70. The opening of the door or motion of the door handle may otherwise mechanically activate the solid state battery and deployment of the inflatable device without the employment of any electrical battery actuation components.

In another example, the controller activation event 50 may be activated by a crew member. In a specific embodiment, the controller activation event 50 of the switch 70 of the solid state battery is activated via a signal from the cockpit. In the event of an emergency landing, the pilot can activate the battery in order to begin activation of the battery, which can potentially lessen a potential of accidental slide deployment.

In another example, the controller activation event 50 of the switch 70 of the solid state battery may be activated via a signal from one of the pilots, flight attendants, passengers or other crewmembers. This may be an electronic signal or a mechanical activation. For example, there may be a mechanical activation such that a crew member pulls a cable, which pulls a pin, to start activation of the battery.

In another embodiment, the controller activation event 50 of the switch 70 of the solid state battery may be activated by a standby electrical device. One example of a standby electrical device may be a battery, a capacitor, an electrical generator, aircraft power, or any combination thereof. In this example, the standby electrical device can detect the need for use and send a voltage to the switch 70 of the solid state battery in order to begin activation.

If the battery is associated with a life raft only, it is possible for the controller activation event 50 to be triggered when the life raft is removed from a compartment or fuselage of the aircraft. If the battery is associated with a life vest only, it is possible for the controller activation event 50 to be triggered when the life vest is removed from a storage compartment of the aircraft.

Once the controller activation event 50 occurs, the battery is "alive" and ready to deliver voltage/power to the motor when needed. Referring to FIG. 3, battery voltage/power is available to be delivered to the motor 56 via a signal from a controller 54.

The controller 54 may be an Electronic Speed Control (ESC). The ESC can convert the battery power to three phase electric for use by the motor 56, such as a brushless motor. The controller 54 may receive and process input upon an inflation initiation event 52, such as receiving input from a pull cord, a pressure sensor, a water sensor, or a manual activation switch to determine when to activate the electric motor 56, options of which are further described below.

The inflation initiation event 52 that activates the controller 54 (which in turn activates the electric motor 56) may be any number of events. In a first example, the event 52 may be time-based, such that a certain amount of time after the controller activation event 50, the inflation initiation event 52 will activate the controller 54. In a specific example this may simply be a matter of seconds or milliseconds. A timer may be provided that only activates the controller 54 a specified amount of time after the controller activation event 50. In a further example, activation of battery itself can activate the controller 54 or otherwise function inflation initiation event 52. In another example, the inflation initiation event 52 may occur when the slide/raft/vest pack is removed from its storage compartment. The inflation initiation event 52 may occur via dropping of the pack via gravity. The inflation initiation event 52 may occur via the ejection of the pack via an ejection system. The inflation initiation event 52 may occur via a rip cord, switch, or pull pin that is caused to be activated or released (either via gravity or by aircraft personnel). The inflation initiation event 52 may be activated via a second sensor or switch connected to the door that activates the controller 54 once the door has been opened a certain amount. In another example, the inflation initiation event 52 could be activated via remote control. In a further example, the inflation initiation event 52 could be water contact or a water-activated trigger activated by a water contact/presence sensor. In another example, the inflation initiation event 52 could be the orientation or movement of the system. Any combinations of any of these inflation initiation events 52 are also possible and considered within the scope of this disclosure.

Figure 4:
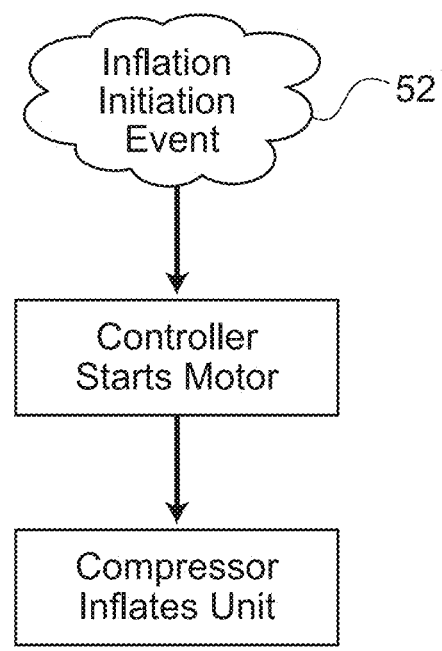
FIG. 4 is a schematic flow chart illustrating steps of inflation after an inflation initiation event.

As outlined by FIG. 4, upon an inflation initiation event 52, as long as the battery is active and supplying current, a controller 54 is activated in order to send a signal to the electric motor 56 to begin activation of the compressor. Electrical current will be transmitted from the solid state battery 50 to power the motor 26. Powering up of the electric motor 56 causes movement of a compressor wheel 58, which begins inflation of the inflatable safety device 62. Movement of the compressor wheel 58 generates a rotational force that creates vacuum to pull ambient air through the air intake inlet 64, diagonally across compressor wheel blades, out the exit, and into the inflatable safety device 62. The motor 56 may run the compressor wheel 58 until a specified pressure is reached and then switch off. Pressure may be sensed by a pressure switch 60 which is in communication with both the inflatable safety device 62 and the controller 54. The electric motor 28 can be configured to continue to run and maintain pressure in the inflatable structure as long as needed.

Providing a separate inflation initiation event 52 in order to activate the controller 54 once the slide and/or slide/raft is in the desired position can provide a safety feature so that the slide or slide/raft does not inflate too early (e.g., inside the aircraft). This can be particularly important for activation of a life raft. For example, this delay feature between controller activation 50 and inflation initiation 52 can provide crewmembers with a defined amount of time in order to position the life raft where needed (i.e., eject the life raft from the aircraft to a water source) before raft inflation is activated. For example, certain regulations require that a life raft be usable within 60 seconds. Accordingly, it is possible for the battery to be activated within 10-30 seconds from the removal event, still allowing additional time for inflation.

In another example, the system is provided with leak detection or low inflation pressure detection. If there is a leak in the inflatable device, the system may be designed such that it is able to detect that leak (or otherwise sense a lowered pressure of the inflatable device), and turn the motor back on in order to continue inflation or increase inflation. For example, the system may be provided with a pressure monitor associated with the motor and battery. If inflation pressure of the inflatable device drops below a predetermined threshold, the monitor can send a signal to switch the motor back on.

For example, a battery-powered motor 56 used on an evacuation slide could maintain the desired inflation pressure of the evacuation slide for an entire evacuation duration. This can allow for a reduction in air-holding requirements for the inflatable system and/or for the air-holding fabric itself. It is possible for a battery-powered electric motor 56 to store extra energy to top off a leaking unit. This could keep a punctured unit operational. An electric or battery powered system can be cycled on and off if need be. For example, the system may cycle on and off depending upon the pressure sensed by an optional pressure sensor 60. For example, the system may be provided with a pressure transducer to monitor inflatable pressure. In one example, the system may be caused to inflate the inflatable safety device to about 1.5 psig and then turn off the compressor. The compressor may then be turned back on if/when the inflatable safety device's pressure drops to 1.0 psig or below. There may also be provided a manual override switch.

The solid state battery 20 may be located in direct contact with the motor 56, such that the solid state battery is mounted with respect to the motor. In an alternate option, the solid state battery may be positioned at a distance from the motor. It is generally desirable that the solid state battery be positioned within at least about 12 feet from the motor/compressor. In some aircraft there may be one solid state battery per motor. In other types of aircraft, there may be one solid state battery per multiple motors. For example, a solid state battery may be centrally located with respect to two or more motors.

In some examples, it is possible for the solid state battery to be located on the inflatable device. In other examples, it is possible for the solid state battery to be located on the packboard assembly or in the enclosure of the inflatable device. In other examples, it is possible for the solid state battery to be located on an aircraft door. In other examples, it is possible for the power source to be directly integrated into the inflation system.

Features and benefits of use of the disclosed solid state battery in connection with an electrically-powered inflation system include but are not limited to:
the solid state battery remains inert until activated;
extended storage life (which may be 50+ years);
a wide temperature range for storage and operation (e.g., in certain testing examples, these ranged from about −65° F. to about 185° F. in a solid state chamber);
a wide pressure range for storage and operation;
high performance at wide range of temperatures and pressures;
high power-to-weight ratio (in some examples, the battery can deliver about 15-20 kW of power for the required short duration and can have a weight as low as 4-5 pounds);
high power-to-volume ratio;
the battery is capable of withstanding high g-forces, vibration, and other environmental factors;
the battery can generally support the required voltage and supply a high discharge rate (e.g., about 300-400 amps). It is generally desirable to stay below about 60 volts for safety purposes, so voltages may be modified as necessary. For example, ranges may be about 40 volts×300 amps (to deliver about 12 kW of power); 60 volts×200 amps; 80 volts×150 amps. If 10 kW of power are needed, the ranges may be about 40 volts×250 amps; 60 volts×166 amps, or any other appropriate options. As background, power is (watts) is measured as voltage combined with current (amps). The higher the voltage, the lower the current, and the smaller the electronics can be, so there is a benefit to maximizing voltage, while also maximizing safety considerations.

The compressor wheel 58, battery 20, and electric motor 56 may be selected to cooperate with one another in order to deliver optimal and desired inflation characteristics. For example, the size of the compressor wheel 56 and the size of the inflatable safety device 62 may dictate the size of the electric motor 56 and battery 20 required for use.

Exemplary inflation parameters for various types of inflatable safety devices are provided in the below table.

| Type of inflatable safety device | Required Power | Expected battery volume |
|---|---|---|
| Large Slide/225 cubic feet per chamber and up | 10-20 kW | 25-100 cubic inches |
| Medium Slide/125 to 225 cubic feet per chamber | 7-15 kW | 20-60 cubic inches |
| Small Slide/Less than 125 cubic feet per chamber | 5-10 kW | 15-50 cubic inches |
| Rafts | 100 to 2000 Watts | 6 to 50 cubic inches |
| Life jackets | 5-50 Watts | 0.5-5 cubic inches |
| Shelters | 50-2000 Watts | 10-100 cubic inches |

Benefits of using an electric or battery-powered motor are that there is no need to house or store any type of gas. Unlike a compressed gas system, there are no primary leak paths while the mixed flow compressor inflation system is waiting to be deployed. It is expected that an electric system will deliver a similar performance regardless of temperature, unlike the use of compressed gas. (A typical compressed gas inflation system provides lower pressure in cold conditions. Units inflated with hot gases from gas generators can lose pressure as the hot gas cools.) An electric or battery-powered motor is also less dangerous than compressed gas and gas generator inflation systems.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. An inflation system for an inflatable safety device, comprising:
an electrically-powered motor;

a solid state battery that provides a power source for the electrically-powered motor, wherein the solid state battery is associated with a switch that is activated upon a controller activation event so that, when the switch is activated, the switch sends a signal to the solid state battery to activate the solid state battery into an active voltage source wherein a controller is activated upon an inflation activation event after the controller activation event, and once the controller is activated a, power from the solid state battery as the active voltage source is delivered to the electrically-powered motor to start inflation of the inflatable safety device.

2. The system of claim 1, wherein the controller activation event comprises one or more of:
motion or opening of a vehicle door or handle;
manual activation via a mechanical connection between the door/handle and the switch and/or controller;
activation or tensioning of a release feature, cable, cord, pin, or webbing
via electrical activation;
via a signal from the cockpit;
via a signal or action from one of the pilots, flight attendants, passengers, or other crewmembers;
via a standby electrical device;
or any combination thereof.

3. The system of claim 2, further comprising a sensor that can detect movement of an aircraft door or handle in order to function as a controller activation event.

4. The system of claim 1, wherein the inflation initiation event comprises one or more of: a time-based activation, such that a certain amount of time after the controller activation event, a timer activates a controller to activate the motor; activation of battery itself activates the controller; removal of the inflatable safety device from its storage compartment; dropping of the inflatable safety device via gravity; the ejection of the pack via an ejection system; via a rip cord, cord, cable, webbing, switch, or pull pin that is caused to be activated either via gravity or by aircraft personnel or occupants; via a second sensor or switch connected to the door that activates a controller once the door has been opened a certain amount; via remote control; via water contact or a water activated trigger activated by a water contact/presence sensor; via orientation or movement of the system; or any combination thereof.

5. The system of claim 1, further comprising a pressure sensor or switch that can monitor inflation pressure, wherein if inflation pressure drops below a predetermined threshold, a signal is sent to switch the electrically-powered motor back on.

6. The system of claim 1, wherein the solid state battery is in direct contact with the electric powered motor or is positioned a distance from the electric powered motor.

7. The system of claim 1, wherein the solid state battery is located on the inflatable safety device, on a packboard assembly, in an enclosure of the inflatable safety device, or on a vehicle door.

8. The system of claim 1, wherein the inflatable safety device comprises an evacuation slide and wherein the solid state battery delivers about 5-20 kW of power.

9. The system of claim 1, wherein the inflatable safety device comprises a life raft and wherein the solid state battery delivers about 100-2000 watts of power.

10. The system of claim 1, wherein the inflatable safety device comprises a life jacket and wherein the solid state battery delivers about 5-50 watts of power.

11. The system of claim 1, wherein the inflatable safety device comprises an inflatable shelter and wherein the solid state battery delivers about 50-1000 watts of power.

12. The system of claim 1, wherein the solid state battery comprises a load profile that provides a burst of power within at least about 3-60 seconds and provides a sustained option for powering the electric powered motor during inflation and relevant usage time of the inflatable safety device.

13. The system of claim 1, wherein the solid state battery has a volume of about 6-100 cubic inches.

14. An inflation system for an inflatable safety device, comprising:
an electrically-powered motor;
a solid state battery that provides a power source for the electrically-powered motor,
wherein a controller is activated upon a controller activation event,
wherein once the controller is activated, power from the solid state battery is delivered to the electrically-powered motor upon an inflation initiation event,
wherein the solid state battery comprises a load profile that provides a high burst of power within at least about 3-60 seconds and provides a sustained option for powering the electric powered motor during inflation and relevant usage time of the inflatable safety device.

* * * * *